(12) United States Patent
Sakai et al.

(10) Patent No.: US 8,848,306 B2
(45) Date of Patent: Sep. 30, 2014

(54) MAGNETIC RECORDING REPRODUCING APPARATUS AND MAGNETIC RECORDING MEDIUM

(75) Inventors: Toshihiko Sakai, Osaka (JP); Yoshiteru Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/586,984

(22) Filed: Aug. 16, 2012

(65) Prior Publication Data

US 2013/0057977 A1 Mar. 7, 2013

(30) Foreign Application Priority Data

Sep. 7, 2011 (JP) .................................. 2011-194647

(51) Int. Cl.
*G11B 5/02* (2006.01)
*G11B 21/02* (2006.01)
*G11B 5/012* (2006.01)
*G11B 5/09* (2006.01)
*G11B 5/00* (2006.01)

(52) U.S. Cl.
CPC .......... *G11B 5/09* (2013.01); *G11B 5/012* (2013.01); *G11B 2005/0005* (2013.01)
USPC ............................................. 360/55; 360/75

(58) Field of Classification Search
None
See application file for complete search history.

(56) References Cited

U.S. PATENT DOCUMENTS

| | | | |
|---|---|---|---|
| 6,154,330 A * | 11/2000 | Nakagawa | 360/48 |
| 6,967,810 B2 * | 11/2005 | Kasiraj et al. | 360/78.04 |
| 2005/0068664 A1 | 3/2005 | Kasiraj et al. | |
| 2005/0069298 A1 * | 3/2005 | Kasiraj et al. | 386/125 |
| 2005/0071537 A1 * | 3/2005 | New et al. | 711/100 |
| 2006/0066975 A1 * | 3/2006 | Soeno et al. | 360/73.03 |
| 2006/0232874 A1 | 10/2006 | Tsuchinaga et al. | |
| 2007/0030588 A1 * | 2/2007 | Tsuchinaga et al. | 360/77.08 |
| 2007/0058281 A1 | 3/2007 | Ohno et al. | |
| 2007/0183071 A1 | 8/2007 | Uemura et al. | |

(Continued)

FOREIGN PATENT DOCUMENTS

| | | |
|---|---|---|
| JP | S58-147802 | 9/1983 |
| JP | 2004095010 A | 3/2004 |

(Continued)

OTHER PUBLICATIONS

U.S. Office Action issued Dec. 5, 2013 in connection with related U.S. Appl. No. 13/587,094.

*Primary Examiner* — Thang Tran
(74) *Attorney, Agent, or Firm* — Edwards Wildman Palmer LLP; David G. Conlin; Stephen D. LeBarron

(57) ABSTRACT

In information recording areas of a disc-shaped magnetic recording medium, recording columns adjacent to each other relative to a radial direction are formed to partially overlap with each other in the radial direction. A first recording and a second recording are selectively performed. In the first recording, a first recording column, a second recording column (the outer adjacent recording column of the first recording column) and a third recording column (the outer adjacent recording column of the second recording column) are formed so that the radial positions of the inner and outer circumferential edges of the first recording column, those of a second recording column, and those of a third recording column satisfy $R1_{in}<R2_{in}<R3_{in}<R1_{out}<R2_{out}<R3_{out}$. In the second recording, a non-overlapping portion which does not overlap with any of the recording columns in the radial direction is formed on each of the recording columns.

6 Claims, 10 Drawing Sheets

(56) References Cited

U.S. PATENT DOCUMENTS

2010/0277827 A1 11/2010 Wood et al.
2011/0090583 A1 4/2011 Mutoh
2012/0162808 A1 6/2012 Masuda et al.
2013/0057978 A1 3/2013 Sakai et al.

FOREIGN PATENT DOCUMENTS

| JP | 2011-008881 A | 1/2011 |
| JP | 2012-003805 A | 1/2012 |
| JP | 2013-058271 A | 3/2013 |

\* cited by examiner

ROTATIONAL DIRECTION OF
MAGNETIC RECORDING MEDIUM
←

ROTATIONAL DIRECTION OF
MAGNETIC RECORDING MEDIUM
←

PRIOR ART

ROTATIONAL DIRECTION OF
MAGNETIC RECORDING MEDIUM
←

ROTATIONAL DIRECTION OF
MAGNETIC RECORDING MEDIUM
←

PRIOR ART

MAGNETIC RECORDING REPRODUCING APPARATUS AND MAGNETIC RECORDING MEDIUM

CROSS REFERENCE TO RELATED APPLICATION

The present application claims priority from Japanese Patent Application No. 2011-194647, which was filed on Sep. 7, 2011, the disclosure of which is herein incorporated by reference in its entirety.

BACKGROUND OF THE INVENTION

1. Field of the Invention

The present invention relates to a magnetic recording reproducing apparatus and a magnetic recording medium, which adopt a Shingle recording technology and capable of densely recording information.

2. Description of the Related Art

Improvement in high quality pictures and images causes a considerable increase in the volume of information handled by a user. For the purpose of realizing a larger capacity magnetic recording apparatus so-called HDD (Hard Disk Drive), approaches for increasing the surface recording density have been discussed. One high-density magnetic recording technology that seems to be promising is a Shingle recording technique which is disclosed in Japanese Unexamined Patent Publication No. 2011-8881 (Tokukai 2011-8881) for example, in which recording is performed so that a recording column currently being recorded partially overlap with another recording column adjacent in a track width direction, the other recording column having been subjected to immediately previous recording.

In general, the pitch of tracks formed on a magnetic recording medium is a several times greater than a shortest mark formed. However, Shingle recording technique performs recording so as to partially overlap with an adjacent recording column having been subjected to immediately previous recording. Therefore, the pitch of tracks to be formed at the end is reduced to a pitch which is approximately the same as the shortest mark length. In other words, recording is performed so as to partially overwrite the adjacent recording column having been subjected to immediately previous recording. This increases the number of tracks per unit length to several times more, and makes it possible a significant improvement in the recording density.

SUMMARY OF THE INVENTION

However, with the apparatus of the Japanese Unexamined Patent Publication No. 8881/2011 (Tokukai 2011-8881), rewriting of a recording column necessitates rewriting of all the subsequently-formed recording columns. This may lead to a lower substantial recording rate (the information amount of recording column rewritten/time required for rewriting recording columns to be rewritten and not rewriting the information of the other recording columns). This is elaborated with reference to FIG. 9A to FIG. 9D.

FIG. 9A shows a plurality of recording columns on a magnetic recording medium, each of which is formed so as to partially overlap with a recording column adjacent in the track width direction (radial direction of the recording medium). Specifically, throughout the entire radial direction, each of the recording columns forms an overlapping portion in which the recording column is overlapped with any of two adjacent recording columns in a radial direction. In FIG. 9A to FIG. 9D, the boarder lines and the center lines of the tracks obtained at the end (tracks at the time of reproducing) are indicated by dotted lines and dashed lines, respectively. FIG. 9B shows a state after recording a recording column for forming a track Tr102' for rewriting the track Tr102 shown in FIG. 9A.

The recording column for forming a track Tr101 is formed prior to formation of the recording column for forming a track Tr102. Therefore, the information on the track Tr101 remains without being rewritten. On the other hand, a track Tr103 is overwritten with the recording column for forming the Tr102', and an attempt to reproduce the track Tr103 under such a condition will result in a reproduction error. Therefore, the recording column for forming the track Tr103 formed after the formation of the recording column for forming the track Tr102 needs to be overwritten with a recording column for forming the track Tr103' with information identical to that on the recording column for forming the track Tr103. FIG. 9C shows a schematic view of the state after overwriting with the recording column for forming the track Tr103'. All the recording columns formed after the formation of the recording column for forming the track Tr102 need to be successively overwritten, in the similar manner. FIG. 9D schematically shows a state in which all the recording columns formed after the recording column for forming the track Tr102 are overwritten.

As described, rewriting only the track Tr102 requires, in total, a time for forming the recording column for forming the track Tr102', and a time for overwriting all the recording columns formed after the recording column for forming the track Tr102. This requires a rewriting time which is several times longer than the prior recording technique.

It is therefore an object of the present invention to provide a magnetic recording reproducing apparatus and a magnetic recording medium, in which a decrease in the substantial recording rate for rewriting operation is prevented and a reproduction error hardly occurs, in cases of adopting a Shingle recording technique which allows a densely recording.

A magnetic recording reproducing apparatus of the present invention includes: a disc-shaped magnetic recording medium having thereon information recording areas; a magnetic recording element configured to perform information recording, by applying a magnetic field to the magnetic recording medium to form recording columns extending in a circumferential direction of the magnetic recording medium; a magnetic reproducing element, which performs information reproduction by detecting leaked magnetic field from the magnetic recording medium; a moving mechanism configured to move the relative positions of the magnetic recording medium, the magnetic recording element and the magnetic reproducing element, in the circumferential direction and a radial direction of the magnetic recording medium; and a magnetic recording element control unit configured to control the magnetic recording element and the moving mechanism so that any of the recording columns and another one of the recording columns adjacent thereto in the radial direction are partially overlapped with each other relative to the radial direction, within the information recording areas. The magnetic recording element control unit selectively performs a first recording which achieves $R1_{in} < R2_{in} < R3_{in} < R1_{out} < R2_{out} < R3_{out}$, where radial positions of the inner and outer circumferential edges of a first recording column are $R1_{in}$ and $R1_{out}$, respectively, and radial positions of the inner and outer circumferential edges of a second recording column are $R2_{in}$ and $R2_{out}$, the second recording column being the outer adjacent recording column to the first recording column, and radial positions of the inner and outer circumferential edges of a third recording column are $R3_{in}$ and $R3_{out}$, the third recording column being the outer adjacent recording column to the second recording column, and a second recording such that each of the recording columns has a non-overlapping portion which is not overlapped with any of the recording column in the radial direction.

A magnetic recording medium of the present invention is a disc-shaped magnetic recording medium comprising information recording areas each having a plurality of recording columns extending in a circumferential direction. The information recording areas include a first information recording area in which each of the recording columns in the area has an overlapping portion which partially overlaps with an adjacent recording column in a radial direction and a non-overlapping portion which does not overlap with any of the recording columns in the radial direction, and a second information recording area in which none of the recording columns in the area has the non-overlapping portion which does not overlap with any of the recording columns in the radial direction.

In the following description, the "recording column" formed by the first recording or the second recording means a column of a magnetic pattern recorded by the magnetic recording element. The "track" formed by the first recording means a radial area (an area of the recording column which is not covered by another recording column) retaining the information of the recording column after the recording column is overlapped with an adjacent recording column. On the other hand, the "track" formed by the second recording means the non-overlapping portion.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

First Embodiment

Figure 4:
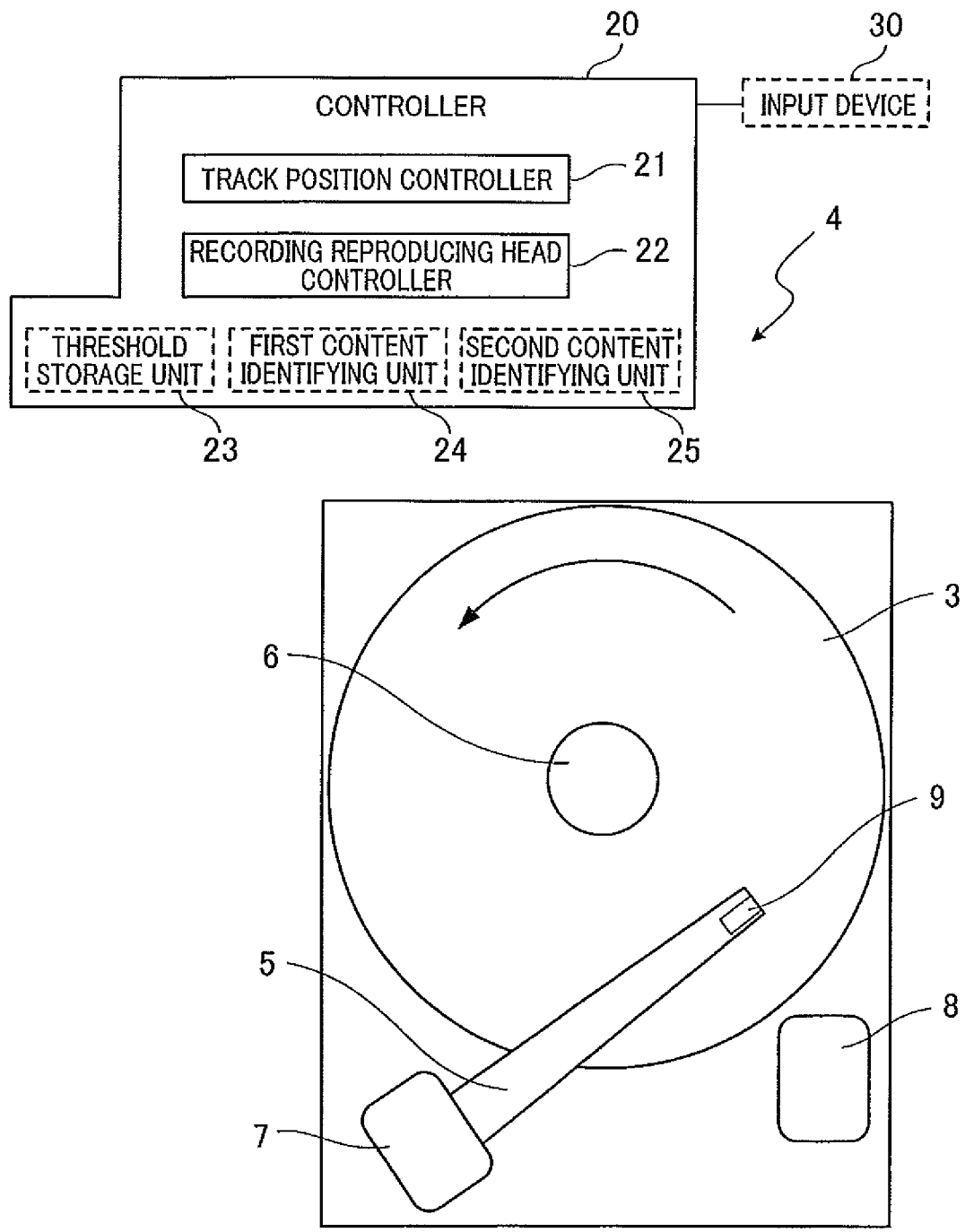
FIG. 4 shows a schematic configuration of a magnetic recording reproducing apparatus which performs recording/reproducing with respect to the magnetic recording medium of FIG. 1.

The following describes a first embodiment of present invention. As shown in FIG. 4, a magnetic recording reproducing apparatus 4 of the present embodiment includes: a suspension 5, a spindle 6, a voice coil motor 7, a ramp mechanism 8, a recording reproducing head 9, and a controller 20 which controls the suspension 5, the voice coil motor 7, and the recording reproducing head 9. Note that FIG. 4 shows the magnetic recording reproducing apparatus 4 with a disc-shaped magnetic recording medium 3. The structure of the magnetic recording medium 3, the recording and reproduction method of the magnetic recording medium 3 by the magnetic recording reproducing apparatus 4, and the details of the controller 20 are explained later.

The suspension 5 has one end portion fixed to the voice coil motor 7 and another end portion far from the voice coil motor 7 having a recording reproducing head 9 which applies a magnetic field to the magnetic recording medium 3. The spindle 6 rotates the magnetic recording medium 3 counterclockwise (the direction of the arrow shown in FIG. 4), when the magnetic recording reproducing apparatus 4 records or reproduces information to or from the magnetic recording medium 3. At the center portion of the magnetic recording medium 3 is formed a hole to which the spindle 6 is fit. The voice coil motor 7 moves the suspension 5 so that the recording reproducing head 9 attached to the suspension 5 moves above the magnetic recording medium 3 in radial directions (cross-track directions) of the magnetic recording medium 3. In other words, the recording reproducing head 9 is capable of changing its position relative to the radial directions of the magnetic recording medium 3, according to the movement of the voice coil motor 7. The ramp mechanism 8 is for setting back the recording reproducing head 9 when no recording or reproduction of information is performed to or from the magnetic recording medium 3. In other words, when no recording or reproduction of information is performed, the recording reproducing head 9 is fixed to the ramp mechanism 8.

Note that, the spindle 6, a not-shown motor (relating to movement in the circumferential direction) which rotates the spindle 6, the suspension 5 (related to movement in the radial direction), and the voice coil motor 7 (related to movement in the radial direction) structure a "moving mechanism" of the present embodiment.

Figure 5:
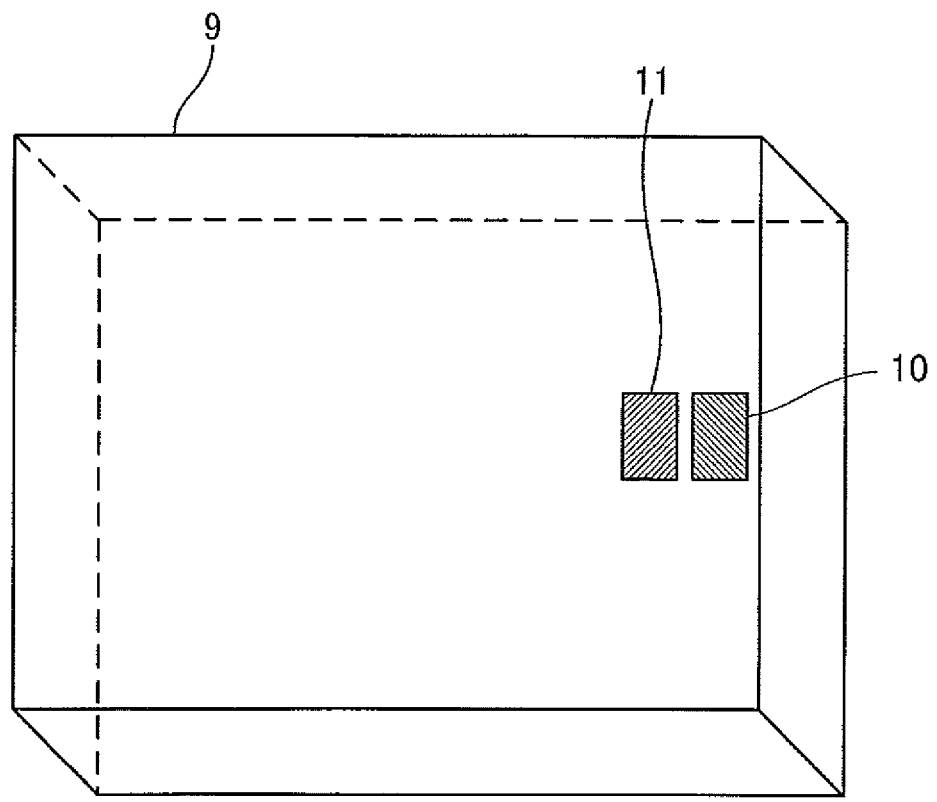
FIG. 5 shows a schematic configuration of a recording reproducing head of the magnetic recording reproducing apparatus shown in FIG. 4.

The recording reproducing head 9 is for recording and reproducing magnetic information. Specifically as shown in FIG. 5, the surface of the recording reproducing head 9 close to the magnetic recording medium 3 (i.e., the surface facing the magnetic recording medium 3) is provided with a magnetic recording element 10 and a magnetic reproducing element 11 for a vertical magnetic recording medium.

The magnetic recording element 10, when recording information to the magnetic recording medium 3, applies a magnetic field of a recordable intensity to the magnetic recording medium 3, thereby forming a recording column extended in a circumferential direction (track direction) of the magnetic recording medium 3. This way, for example, the direction of magnetization on the magnetic recording medium 3 is determined. The magnetic reproducing element reads a magnetization pattern by detecting a leaked magnetic field from the magnetic recording medium 3, thereby reproducing the information. Note that the positional relation between the magnetic recording element 10 and the magnetic reproducing element 11 relative to the circumferential direction when viewed from the magnetic recording medium 3 is such that, when the recording reproducing head 9 passes any given position of the magnetic recording medium 3, the magnetic reproducing element 11 passes that position first, followed by the magnetic recording element 10.

As described, the magnetic recording reproducing apparatus 4 is capable of performing recording and reproduction to a predetermined position of the magnetic recording medium 3, with the operations of the spindle 6 and the suspension 5, and by controlling application of the magnetic field by the recording reproducing head 9. In other words, the magnetic recording reproducing apparatus 4 includes a controller 20 which performs a predetermined computing process for controlling various functions of the suspension 5, spindle 6, or the like. For example, the controller 20 is realized by a CPU (Central Processing Unit) or the like. As shown in FIG. 4, the controller 20 includes: a track position controller 21 which controls the suspension 5 and the voice coil motor 7 thus enabling tracking of a predetermined track (the track to be followed and subjected to recording or reproduction); a recording reproducing head controller 22 which controls the recording reproducing head 9 to record or reproduce information to/from the magnetic recording medium 3 at a predetermined timing.

Figure 1:
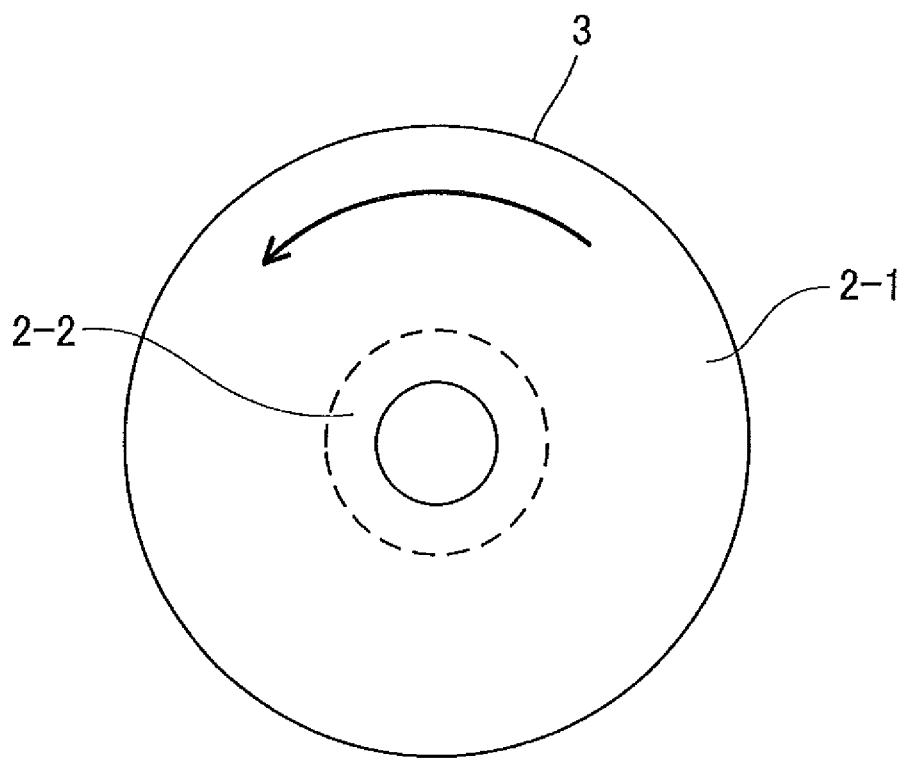
FIG. 1 shows schematically a magnetic recording medium related to a first embodiment, according to the present invention.

Next, the following describes a magnetic recording medium 3 included in the magnetic recording reproducing apparatus 4. As shown in FIG. 1, the magnetic recording medium 3 of the present embodiment has a first area 2-1 and a second area 2-2 which is the inner adjacent area of the first area 2-1. The first area 2-1 and the second area 2-2 are subjected to later-described first recording and second recording, respectively. In other words, in the present embodiment, information is recorded in the first area 2-1 through the first recording, and information is recorded in the second area 2-2 through the second recording, irrespective of the rewriting frequency or the attribute of the content. It is possible to allow a user to decide what content goes to which one of the areas. Alternatively, the apparatus may freely determine what content goes to which one of the areas, irrespective of the attribute of the content or the like and without a criterion for sorting the content. Further, the content may be sorted based on the rewriting frequency or the attribute of the content, as is the case of a later-described modification. That is, in the present invention, there is no particular limitation on a technique of selecting which one of the first recording and second recording is to be performed. As a modification, the first area 2-1 and the second area 2-2 may be subjected to the second recording and the first recording, respectively.

The magnetic recording medium 3 of the present embodiment is manufactured by: forming a magnetic layer on a glass substrate; polishing the surface to smoothen the same; and applying a lubricant. The material (magnetic layer) which forms a magnetic recording part may be, for example, Co, Pt, Fe, Ni, Cr, Mn, or an alloy of any of these metals. Examples of the above alloy include, for example, CoPt, SmCo, CoCr, and TbFeCo alloy. Further, in the present embodiment, the magnetic recording surface is formed only on one side of the magnetic recording medium 3. However, the present invention is not limited to this, and the magnetic recording surface may be formed on both sides of the magnetic recording medium 3. In such a case, the above mentioned processes of the manufacturing method are carried out on both sides of the magnetic recording medium 3. Note that application of the lubricant on the magnetic recording surfaces on both sides of the magnetic recording medium 3 may be carried out at the same time.

Figure 2A:
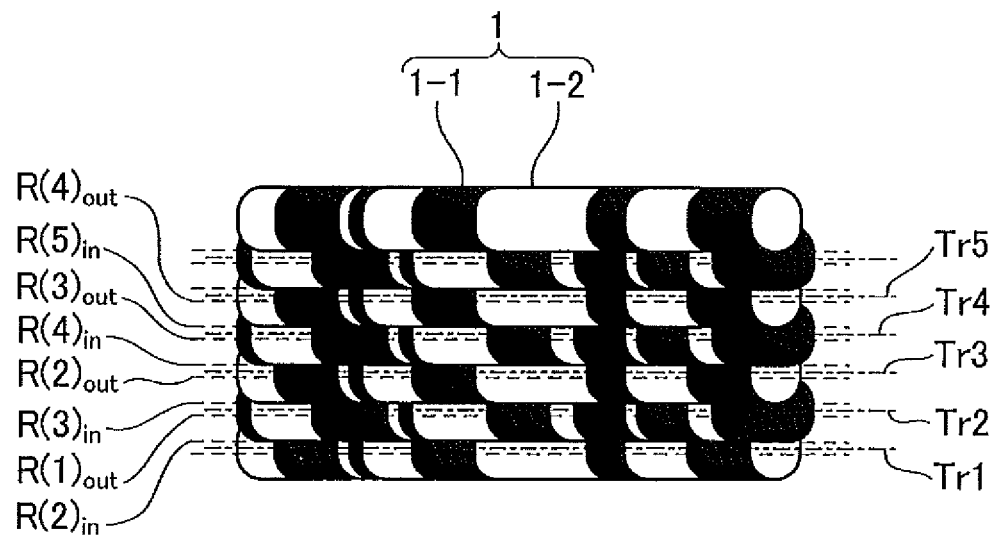
FIG. 2A and FIG. 2B schematically shows a plurality of recording columns formed in a first recording on the magnetic recording medium related to the first embodiment, according to the present invention.

Next, the following describes control performed by the controller 20. As mentioned hereinabove, the controller 20 controls the suspension 5, the voice coil motor 7, and the recording reproducing head 9 to form on the magnetic recording medium 3 a plurality of recording columns shown in FIG. 2A. Since the rotational direction of the magnetic recording medium 3 is from the right to left (arrow direction of FIG. 4), each of the recording columns is formed from the left to the right side of the figure. For example, the magnetic recording medium 3 is a type of medium on which information is recorded by magnetizing the medium in a direction perpendicular to its in-plane direction. As shown in FIG. 2A (second area 2-2) and FIG. 3A (first area 2-1), a magnetization pattern 1-1 (positive polarity) of the present embodiment which is in a direction from the viewer of the figure towards the figure is shown in black, and a magnetization pattern 1-2 (negative polarity) which is in a direction from the figure towards the viewer of the figure is shown in white. These patterns are simply referred to as magnetization pattern 1, unless their polarities need to be distinguished.

Figure 2B:
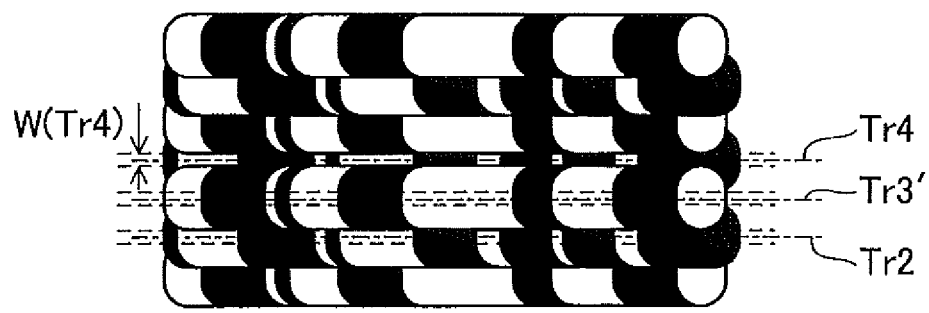
Figure 3A:
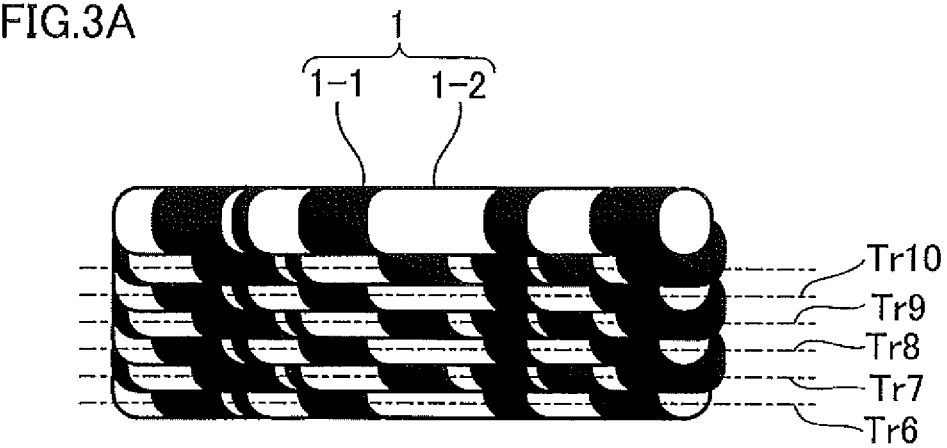
FIG. 3A, FIG. 3B, and FIG. 3C schematically show a plurality of recording columns formed in a second recording on the magnetic recording medium related to the first embodiment, according to the present invention.

As shown in FIG. 2A and FIG. 3A, the controller 20 performs control to form, on the magnetic recording medium 3, a plurality of recording columns (where radial positions of the inner and outer circumferential edges of an n-th recording column are $R(n)_{in}$ and $R(n)_{out}$, respectively, the width of the column is $R(n)_{out}$-$R(n)_{in}$) each extending in the circumferential direction of the magnetic recording medium 3, sequentially in a radial direction from one side (from the bottom of the figure) to the other side (upper portion of the figure) of the magnetic recording medium 3. The recording columns formed on the magnetic recording medium 3 are formed so that each recording column partially overlaps in the radial direction another recording column adjacent relative to the radial direction. In other words, the magnetization pattern in each recording column has a portion relative to the width direction (radial direction) which is overwritten by a recording column formed immediately after. Thus, as shown in FIG. 2A, tracks Tr1, Tr2, Tr3 . . . are formed in the second area 2-2, sequentially in the direction from the lower portion to the upper portion of the figure. Further, as shown in FIG. 3A, tracks Tr6, Tr7, Tr8 . . . are formed in the first area 2-1, in the direction from the lower portion to the upper portion of the figure. In FIG. 2A, FIG. 2B, FIG. 3A, FIG. 3B, and FIG. 3C, the boarder lines and the center lines of the tracks are indicated by dotted lines and dashed lines.

The following describes steps of a process, particularly a recording method, performed in the controller 20.

To form an n-th recording column (n=any given natural number ranging from 1 to N at the maximum) on the magnetic recording medium 3 in the magnetic recording reproducing apparatus 4 of the present embodiment, the controller 20 which controls the suspension 5, the voice coil motor 7, and the recording reproducing head 9 controls formation of the n-th recording column so that the n-th recording column partially overlaps an (n−1)th recording column which is the immediately previous track, in the radial direction.

The controller 20 serving as the magnetic recording element control unit performs control so that a plurality of recording columns are formed in the radial direction in the second area 2-2. More specifically, where the radial positions of the inner and outer circumferential edges of the n-th recording column for forming an n-th track are $R(n)_{in}$ and $R(n)_{out}$, respectively, and where the inner and outer adjacent recording columns to the n-th recording column are an (n−1)th recording column and an (n+1)th recording column, respectively, the controller 20 performs control so as to achieve $$R(n-1)_{in} < R(n)_{in} < R(n-1)_{out} - R(n+1)_{in} < R(n)_{out} < R(n+1)_{out} \quad (1).$$

This leaves at least a radial range from $R(n-1)_{out}$ to $R(n+1)_{in}$ as a non-overlapping portion which does not overlap with any of the recording columns, at any given condition. In this non-overlapping portion remains information of the n-th recording column.

This is elaborated below with reference to FIG. 2A and FIG. 2B. To record information in an area where no magnetic information is recorded, a plurality of recording columns are formed so that, starting from formation of the first recording column for forming the first track, the second recording column, the third recording column, . . . are sequentially formed to satisfy the equation (1). This leaves a radial range from $R(3)_{out}$ to $R(5)_{in}$ as a non-overlapping portion which does not overlap with any other recording columns. In this non-overlapping portion remains information of the fourth track Tr4. Suppose that $R(3)_{out} \geq R(5)_{in}$ and that only the recording column for forming the third track Tr3 is rewritten, the information of the fourth track Tr4 is not retained, and the information of the recording column for forming the third track Tr3 overwrites the track Tr4. As the result, the information of the recording column for forming the third track Tr3 is reproduced at the radial position corresponding to the fourth track Tr4, leading to a reproduction error. When the recording column contains a pattern for drawing a PLL (Phase Locked Loop), reproduction error of the pattern for drawing a PLL leads to PLL-drawing error such as generation of wrong clock. To prevent such a reproduction error, the recording column for forming the fourth track Tr4 needs to be overwritten, and the fifth and the subsequent recording columns also need to be overwritten.

However, in the present embodiment, $$R(4)_{in} < R(3)_{out} < R(5)_{in} < R(4)_{out}.$$

Therefore, the information of the fourth track Tr4 is retained in the radial range having a width W(Tr4), which ranges from $R(3)_{out}$ to $R(5)_{in}$. There is no need of overwriting the fifth and the subsequent recording columns. This shortens the total time taken for rewriting, and prevents a decrease in the substantial recording rate.

Supposing that the width of each recording column relative to the radial direction is the same, if $R(n-1)_{out} < R(n)_{out}$, $R(n-1)_{in} < R(n)_{in}$, and if $R(n)_{in} < R(n+1)_{in}$, $R(n)_{out} < R(n+1)_{out}$. The equation (1) therefore may be simply expressed as:

$$R(n)_{in} < R(n-1)_{out} < R(n+1)_{in} < R(n)_{out} \quad (2).$$

Similarly, supposing that the width of each recording column relative to the radial direction is the same and the track pitch is the same, the equation (1) may be expressed as follows, using the track pitch $W_{Tr}$ (e.g. $R(n)_{in} - R(n-1)_{in}$) and the width $W_W$ (e.g. $R(n)_{out} - R(n)_{in}$) of the magnetic pattern relative to the radial direction which is formed by the magnetic recording element, $$W_w/2 < W_{Tr} < W_W \quad (3).$$

Since the equation (1) is satisfied in the second area 2-2 in the present embodiment, the information of the n-th recording column is retained in the radial range from $R(n-1)_{out}$ to $R(n+1)_{in}$. Thus, in an area of a magnetic recording medium where no information is recorded, the recording columns do not necessarily have to be formed in a direction from the inner circumference to the outer circumference or in the opposite direction. In other words, it is possible to perform control such that recording columns are formed in a random order.

The control in the second recording for the second area 2-2 is not limited to the above. For example, performing control to achieve $R(3)_{out} \leq R(4)_{in}$ and $R(4)_{out} \leq R(5)_{in}$ will also leave a non-overlapping portion on each recording column, which does not overlap with any other recording column. As should be understood, with the control to leave the non-overlapping portion which does not overlap with any other recording columns, the information recorded in the non-overlapping portion is retained without being rewritten at least in the non-overlapping portion, even without the overlapping portion and even after rewriting any of the recording columns. It is therefore not necessary to overwrite the recording columns other than the recording column rewritten. This results in a slightly lower track density, and slightly lower recording density, when compared with the first recording for the first area 2-1. However, the substantial recording rate for rewriting operation is made higher than that of the first area 2-1.

Meanwhile, in the first area 2-1, the controller 20 serving as the magnetic recording element control unit performs control so that a plurality of recording columns are formed at constant intervals in the radial direction (sequential recording). More specifically, where the radial positions of the inner and outer circumferential edges of the m-th recording column for forming an m-th track are $R(m)_{in}$ and $R(m)_{out}$, respectively, and where the inner and outer adjacent recording columns to the m-th recording column are an (m−1)th recording column and an (m+1)th recording column, respectively, the controller 20 performs control so as to achieve $$R(m-1)_{in} < R(m)_{in} < R(m+1)_{in} < R(m-1)_{out} < R(m)_{out} < R(m+1)_{out} \quad (4).$$

Although this results in a lower substantial recording rate for rewriting operation than that of the second recording for the second area 2-2, recording at a higher track density is possible.

Figure 3B:
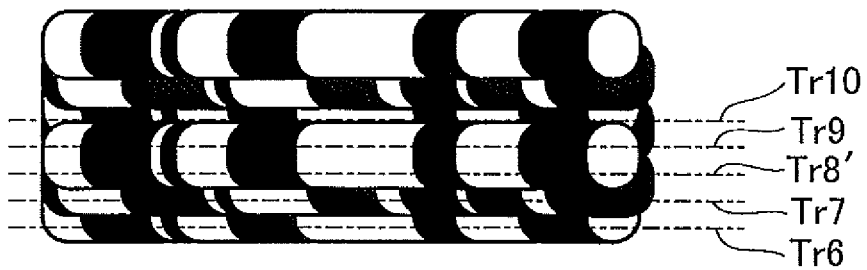
Figure 3C:

This is elaborated below with reference to FIG. 3A to FIG. 3C. To record information in an area where no magnetic information is recorded, a plurality of recording columns are formed so that, starting from formation of the first recording column for forming the first track, the second recording column, the third recording column, . . . are sequentially formed to satisfy the equation (4). Since $R(8)_{out} \geq R(10)_{in}$, when only the recording column for forming the eighth track Tr8 is rewritten, the information of the ninth track Tr9 is not retained, and the information of the recording column retaining for forming the eighth track Tr8 overwrites the track Tr9. As the result, the information of the recording column for forming the eighth track Tr8 is reproduced at the radial position corresponding to the ninth track Tr9, leading to a reproduction error. To prevent such an error, the recording column for forming the ninth track Tr9 needs to be overwritten, and then recording column for forming tenth track Tr10 and the subsequent recording columns also need to be overwritten to complete the rewriting operation. As the result, the substantial recording rate for rewriting operation is lowered. However, since $R(8)_{out} \geq R(10)_{in}$, recording information at a higher track density than that of the second recording for the second area 2-2 is possible. Therefore, a highly dense recording is possible.

Supposing that the width of each recording column relative to the radial direction is the same, if $R(m-1)_{out} < R(m)_{out}$, $R(m-1)_{in} < R(m)_{in}$, and if $R(m)_{in} < R(m+1)_{in}$, $R(m)_{out} < R(m+1)_{out}$. The equation (4) therefore may be simply expressed as:

$$R(m)_{in} R(m+1)_{in} R(m-1)_{out} < R(m)_{out}.$$

Similarly, supposing that the width of each recording column relative to the radial direction is the same and the track pitch is the same, the equation (4) may be expressed as follows, using the track pitch $W_{Tr}$ (e.g. $R(m)_{in}$-$R(m-1)_{in}$) and the width $W_W$ (e.g. $R(m)_{out}$-$R(m)_{in}$) of the magnetic pattern relative to the radial direction which is formed by the magnetic recording element, $$W_{Tr} < W/2 \quad (5).$$

In the present embodiment, where the width (width of sensing area) of the magnetic reproducing element 11 relative to the radial direction in the second recording is $W_r$, the following condition is satisfied:

$$\{R(m+1)_{in}-R(m-1)_{out}\} W_r/2 \quad (6).$$

Suppose the equation (6) is not satisfied. In this case, after the (m−1)th track Tr (m−1) is rewritten, the portion of the track Tr (m) retaining information has a width relative to the radial direction, which is less than a half of the width Wr of the magnetic reproducing element 11. If the m-th track Tr (m) is reproduced, a half or more of the detected leaked magnetic field could be a component of inter-track cross-talk or the like from adjacent tracks, no matter how the tracking is performed. Such a component may be greater than that from the track to be reproduced.

On the contrary, suppose the equation (6) is satisfied. In this case, at the time of reproducing the m-th track Tr (m) after the (m−1)th track Tr (m−1) is rewritten, the area retaining information of the track Tr (m) has a width relative to the radial direction, which is wider than a half of the width Wr of the magnetic reproducing element 11. Thus, by tracking the track to be reproduced with the magnetic reproducing element 11, the leaked magnetic field contains less component of the inter-track cross-talk or the like from the adjacent tracks than that from the track to be reproduced. Therefore, reproduction error less likely takes place.

This way, signals from the track to be reproduced is more clearly detected than signals from the inner and outer adjacent tracks. It is therefore possible to restrain reproduction errors.

As mentioned above, the magnetic recording reproducing apparatus 4 of the present embodiment enables the controller 20 to selectively perform the first recording and the second recording. When information should be recorded at a high recording density, even if doing so will cause a lower substantial recording rate for rewriting operation, the information can be recorded in the first area 2-1 through the first recording. On the other hand, when information should be recorded so that rewriting at a high substantial recording rate is possible, even if doing so will cause a relatively low density, the information can be recorded in the second area 2-2 through the second recording. Selective use of the abovementioned two recording modes in a single magnetic recording reproducing apparatus achieves the both a high recording density and a high substantial recording rate for rewriting operation.

Note that the first area and the second area do not have to be provided beforehand as in the present embodiment. Effects similar to the present embodiment is achieved by storing, in the magnetic recording reproducing apparatus, the type of control (track pitch) for forming recording columns in association with the area and address of the recording column. This enables a predetermined rewriting operation to be performed, based on the type of control (track pitch) for forming the recording column, which is specified by referring to the area and address of the recording column.

As one modification, the following structure is possible. Namely, the controller 20 may include a threshold storage unit 23 which stores a threshold for rewriting frequency, and a first content identifying unit which distinguishes content with a higher rewriting frequency than the threshold, from content with a lower rewriting frequency than the threshold. The threshold may be determined by the user. In this case, the controller 20 performs control so that content with a lower rewriting frequency than the threshold is recorded in the first area 2-1, and content with a higher rewriting frequency than the threshold is recorded in the second area 2-2. This way, the first area 2-1 and the second area 2-2 are selectively used according to the rewriting frequency. It is therefore possible to achieve the both a high recording density and a high substantial recording rate for rewriting operation. The value related to the rewriting frequency does not have to be recorded in the content. When new content is recorded, the user may register the information in the content or in the magnetic recording reproducing apparatus 4. For example, where the threshold is once a day, if the user-registered rewriting frequency of the content is higher than once a day, that content is recorded in the second area 2-2. If the user-registered rewriting frequency is lower than once a day, the content is recorded in the first area 2-1.

Further, the magnetic recording reproducing apparatus 4 may store a log of dates for rewriting content. When the rewriting frequency of the content based on the log is lower than the threshold, i.e., a predetermined rewriting frequency, the content which is in the second area 2-2 at first may be re-saved (moved) to the first area 2-1. On the other hand, when the rewriting frequency of content in the first area 2-1 at first surpasses the threshold, i.e., predetermined rewriting frequency, the content may be re-saved (moved) to the second area 2-2. This way, even if the rewriting frequency of content is variable, it is possible to reflect the frequency of rewriting performed by the user. It is therefore possible to achieve the both a high recording density and a high substantial recording rate for rewriting operation.

As another modification, the controller 20 may include a second content identifying unit 25 configured to determine, based on the attribute of content, whether the content belongs to a first class or a second class whose expected rewriting frequency is higher than that of the first class. The second content identifying unit 25 stores a criterion for determining which one of the first and second classes the content belongs to. The class of content is determined based on this criterion. This criterion may be determined by the user. The controller 20 performs control so that content belonging to the first class is recorded in the first area 2-1 through the first recording, and content belonging to the second class is recorded in the second area 2-2 through the second recording. This way, content is selectively recorded in the first area 2-1 and second area 2-2, according to the attribute of the content (type of the content or the like). It is therefore possible to achieve the both a high recording density and a high substantial recording rate for rewriting operation.

Examples of content belonging to the first class (content with a rewriting frequency expected to be low) include: an Operation System (OS), application software or the like which is not frequently updated. Examples of content belonging to the second class (content with a rewriting frequency expected to be high) include: a document file created by a user, application software or the like which is frequently updated. Further, for example, content which cannot be relocated to a different position of a hard disk drive (HDD) of a personal computer (PC) at the time of defragmentation may be recorded in the first area 2-1 at a higher density than the second area 2-2, and the other types of content may be recorded in the second area 2-2 at a track pitch to achieve a higher substantial recording rate for rewriting operation than that in the first area 2-1. This way it is possible to achieve the both a high recording density and a high substantial recording rate for rewriting operation.

Alternatively, the second content identifying unit 25 may determine which one of the first and second classes the content belongs to as follows.

Determining the class based on the filename extension of the content. In this case, the second content identifying unit 25 stores therein the filename extensions in association with the first class or the second class.
("*.doc", "*.dll", "*.ini", "*.exe", or the like)

Determining content saved by an installer program as the first class, and content other than that as the second class.

Determining content as the first class if the volume thereof is equal to or greater than a predetermined threshold, and as a second class if the volume thereof is smaller than the threshold.

Determining the class of content based on a criteria (date and time, compressed/not compressed, compression rate, name of who created the content) related to an item of the property information (e.g., date of last update).

Determining the class of content as the first class if the content is subject to sequential recording (e.g. AV content), and as the second class if the content is subject to random recording.

As yet another modification, the magnetic recording reproducing apparatus may include an input device (keyboard, mouse, button, touch panel, or the like) 30 which enables the user to select the content recording mode out of the first and second recordings. In this case, the controller 20 performs control so that the content is recorded through the recording mode selected by the user via the input device 30. This enables selective use of the first recording and the second recording according to the selection entered by the user. It is therefore possible to achieve the both a high recording density and a high substantial recording rate for rewriting operation. For example, if the user determines that music data or image data downloaded is content with a low rewriting frequency, that type of content is recorded through the first recording. If the user determines that presentation files or a housekeeping book is content with a high rewriting frequency, that type of content is recorded through the second recording. To have the user select one of the first and second recordings for recording the content, a recording mode selecting menu may be displayed on an image output device or the like (not shown).

As yet another modification, the magnetic recording reproducing apparatus 4 may determine a proportion of the first area 2-1 to the second area 2-2, based on an instruction input by the user via the input device 30. When there is an extra room in the storage capacity, and if the user instructed to expand the second area 2-2, a relatively large area may be allotted to the second area 2-2. On the other hand, when there is no extra room in the storage capacity, and if the user instructed to enlarge the first area 2-1, a relatively large area is allotted to the first area 2-1.

<Modification>

Figure 6A:
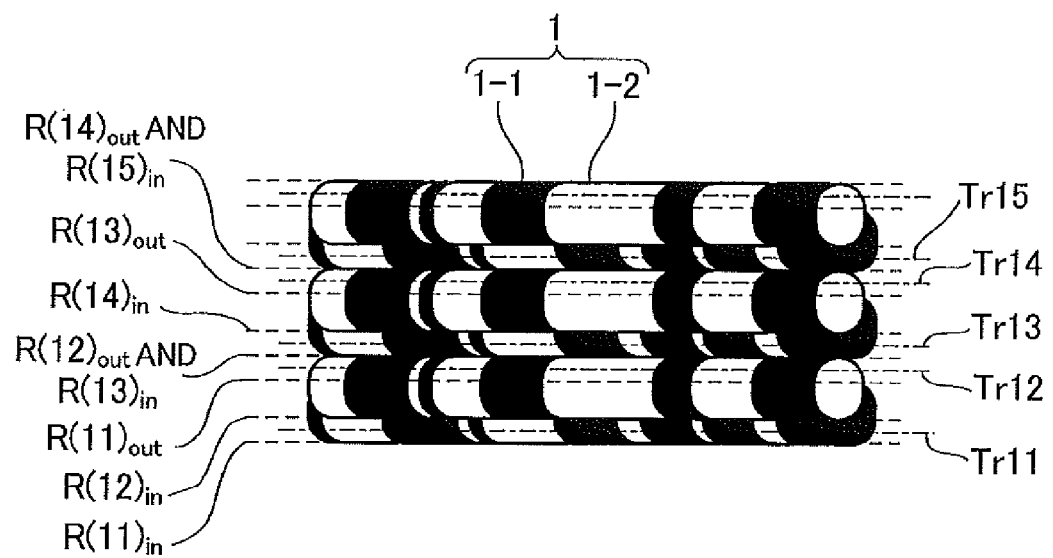
FIG. 6A and FIG. 6B schematically show a plurality of recording columns formed in the second recording on a magnetic recording medium related to a modification of the first embodiment, according to the present invention.
Figure 6B:
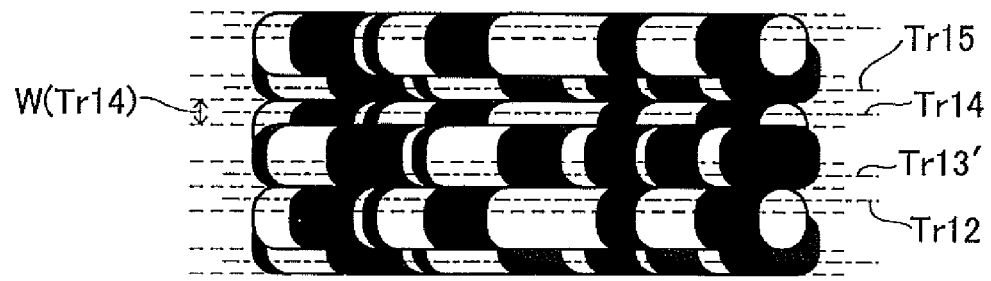

FIGS. 6A and 6B show a modification of the above first embodiment. In the present modification, a pair of two adjacent tracks (e.g. tracks Tr11 and Tr12) forms, in a radial range from $R(12)_{in}$ to $R(11)_{out}$, an overlapping portion of two recording columns for forming the tracks Tr11 and Tr12, respectively. Further, a radial range from $R(11)_{in}$ to $R(12)_{in}$, and a radial range from $R(11)_{out}$ to $R(12)_{out}$ are non-overlapping portions of the recording columns for forming the track Tr11 and Tr12. Tracks Tr13 and Tr14 are formed in the similar manner, so that $R(12)_{out} \leq R(13)_{in}$ (in FIG. 6A, $R(12)_{out}=R(13)_{in}$). In the present modification, the width W(Tr14) of the track Tr14 is $R(14)_{out}-R(13)_{out}$ (see FIG. 6B).

As described, by forming the recording columns so that, for each of the recording column, there is an overlapping portion in which adjacent recording columns overlap with each other relative to the radial direction, and a non-overlapping portion in which a recording column does not overlap with any other recording column relative to the radial direction, the information recorded in the non-overlapping portion which does not overlap with any other recording columns (a radial range from $R(11)_{in}$ to $R(12)_{in}$, a radial range from $R(13)_{out}$ to $R(12)_{out}$, a radial range from $R(13)_{in}$ to $R(14)_{in}$, a radial range from $R(13)_{out}$ to $R(14)_{out}$) is retained without being rewritten, even if the information of another recording column is rewritten. For example, in the state shown in FIG. 6A, if only the recording column for forming the 13th track Tr13 (Tr13') is rewritten, that recording column will not rewrite another track, as shown in FIG. 6B. Therefore, there is no need of rewriting the other recording columns other than the recording column for forming the 13th track Tr13. Note that in the present modification, the recording mode adopted for the first area 2-1 is the same as that of first embodiment.

As described, different recording modes are adopted for the first area 2-1 and the second area 2-2, respectively. Thus, when information should be recorded at a high recording density even if doing so will result in a relatively low substantial recording rate for rewriting operation, that information can be recorded in the first area 2-1 through the first recording. On the other hand, when information should be recorded so that the substantial recording rate for rewriting operation is high, even if doing so will result in a relatively low recording density, that information may be recorded in the second area 2-2 through the second recording. Selectively using the above two recording modes in a single magnetic recording reproducing apparatus achieves the both a high recording density and a high substantial recording rate for rewriting operation.

Second Embodiment

Next, a second embodiment of the present invention is described. Parts and members that are identical to those of the first embodiment are given the same reference numerals, and no further description is provided for them.

Figure 7A:
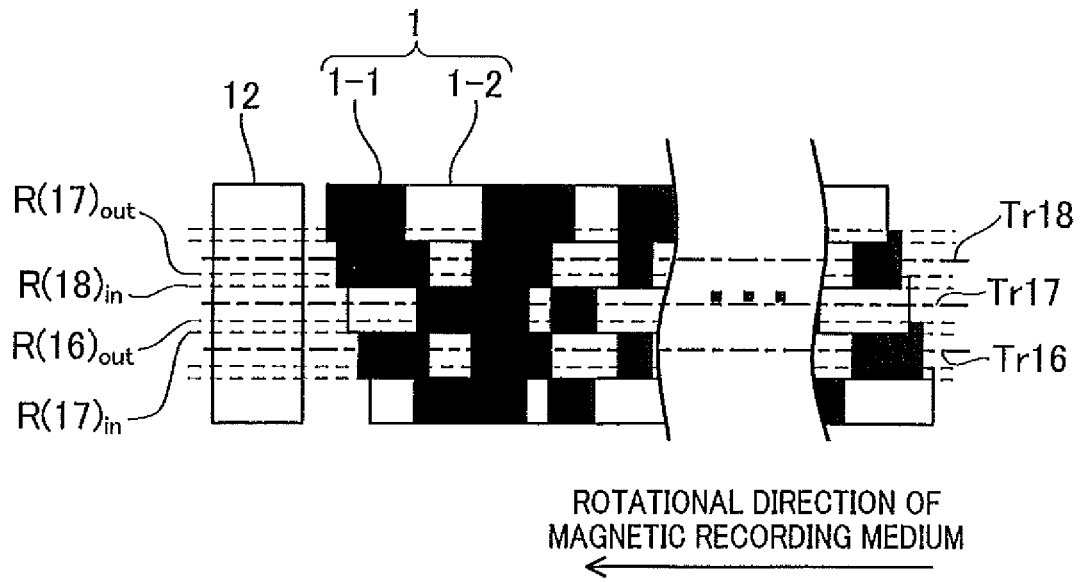
FIG. 7A and FIG. 7B schematically show a plurality of recording columns and a tracking patterns formed on a magnetic recording medium related to the second embodiment, according to the present invention.
Figure 7B:
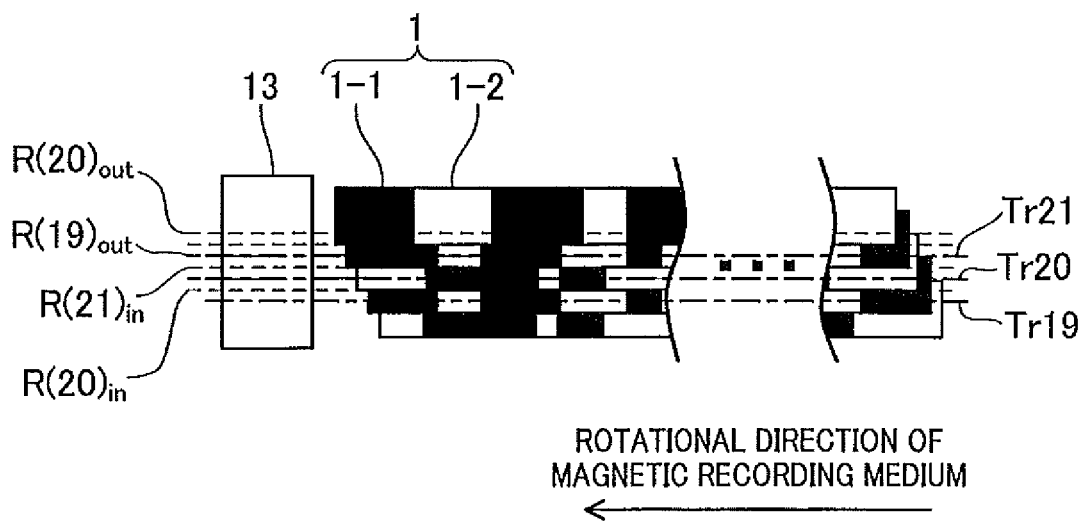
Figure 8A:
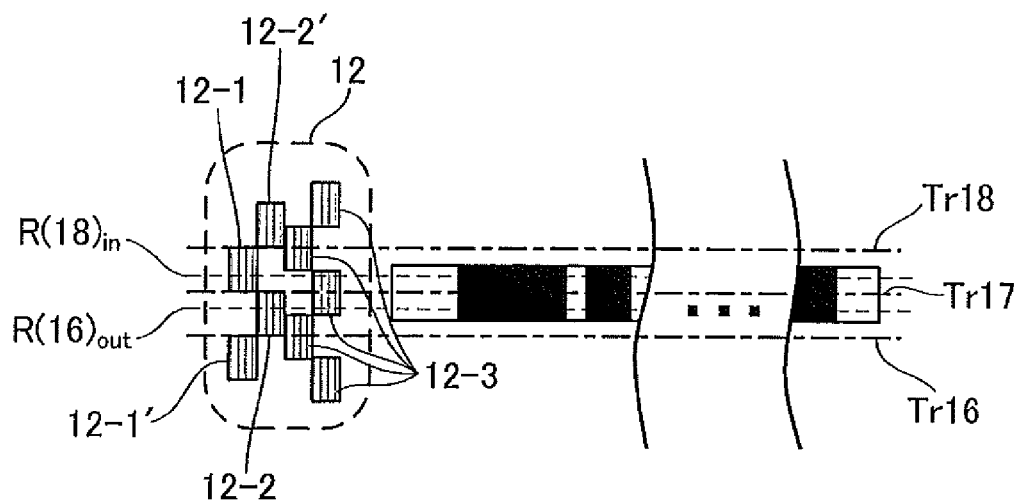
FIG. 8A and FIG. 8B are a partially enlarged view of the plurality of recording columns shown in FIG. 7A and FIG. 7B.
Figure 8B:
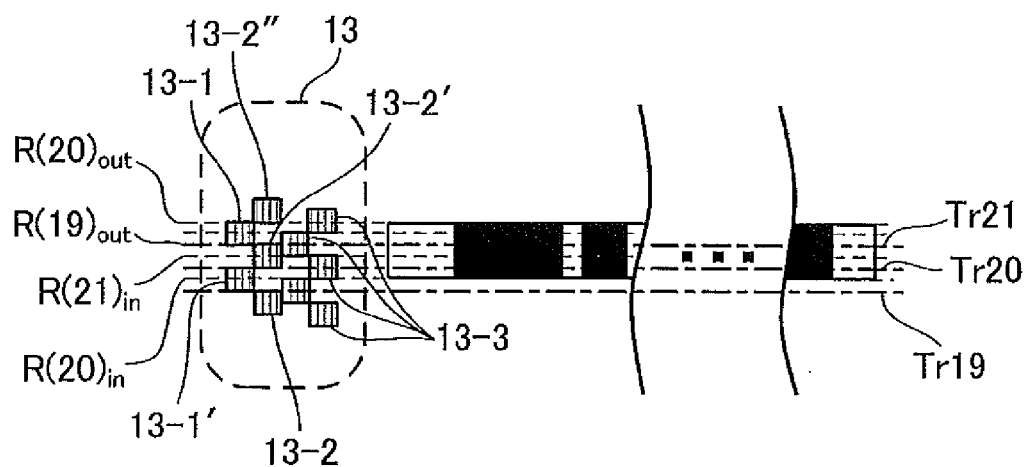
Figure 9A:
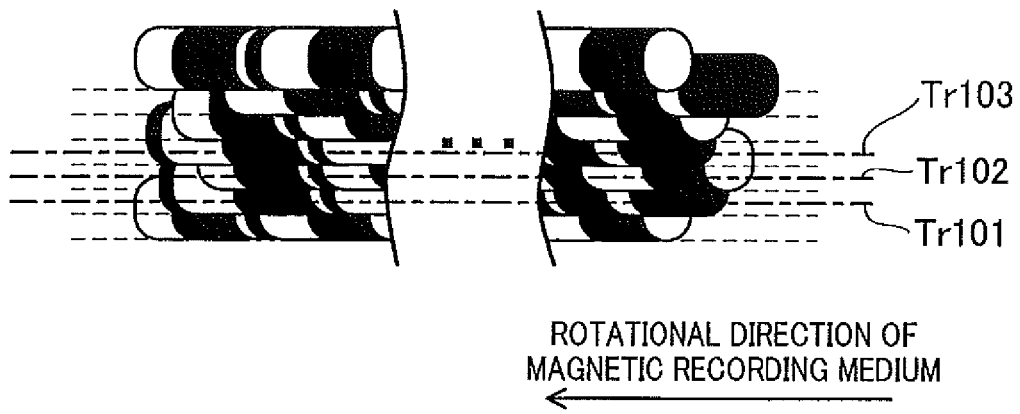
FIG. 9A, FIG. 9B, FIG. 9C, and FIG. 9D schematically show a plurality of recording columns formed on a magnetic recording medium related to a prior art.
Figure 9B:
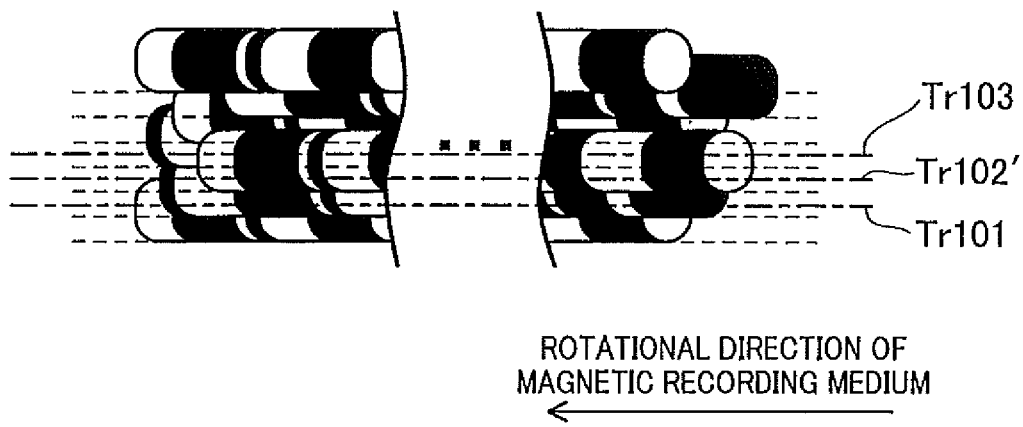
Figure 9C:
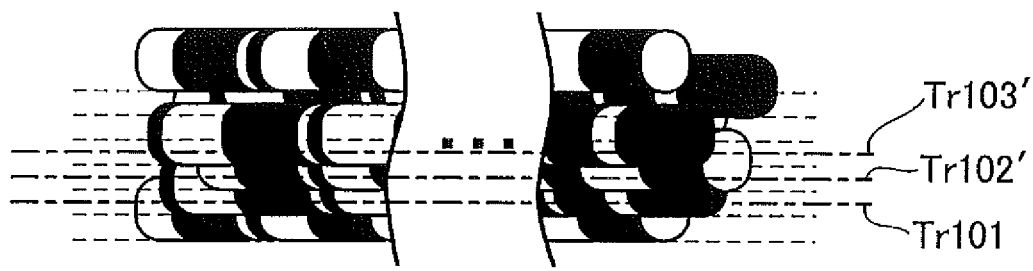
Figure 9D:
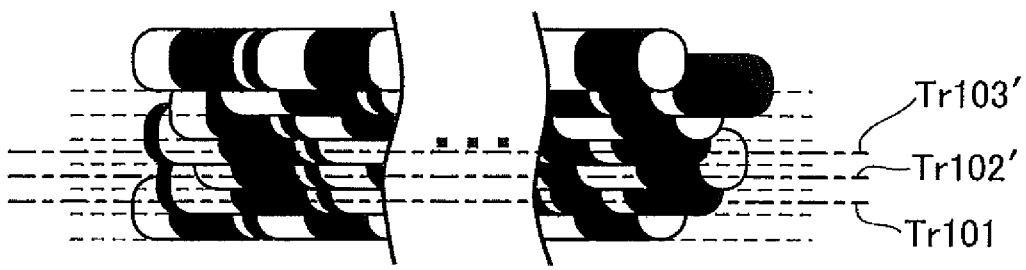

FIG. 7A and FIG. 7B schematically show a magnetic recording medium 3 of the present embodiment, and FIG. 8A and FIG. 8B are partially enlarged views showing in detail parts of FIG. 7A and FIG. 7B, respectively. On the magnetic recording medium 3 are formed a first area 2-1 (FIG. 7B and FIG. 8B) in which information is recorded through a first recording, and a second area 2-2 (FIG. 7A and FIG. 8A) in which information is recorded through a second recording. Further, as shown in FIG. 7A and FIG. 7B, the magnetic recording medium 3 has a tracking pattern (burst pattern) and a tracking pattern 12 (burst pattern) which correspond to the first area 2-1 and the second area 2-2, respectively. The tracking patterns 12 and 13 are magnetization patterns used in tracking servo control for tracks on the magnetic recording medium 3, and are formed by a servo track writer (STW) or the like in the process of manufacturing the magnetic recording reproducing apparatus 4. The magnetic recording medium 3 before being built into the magnetic recording reproducing apparatus 4 is set to an STW having a magnetic recording head for STW. A magnetic field is then applied to the magnetic recording medium 3, while rotating the same, thus forming predetermined magnetic tracking patterns 12 and 13 on the magnetic recording medium 3. Note that the method of forming the tracking patterns 12 and 13 is not limited to the one described above. For example, using a master media storing servo information in advance, the tracking patterns 12 and 13 may be formed through magnetic transferring (stamping method). The tracking pattern 12 or 13 is formed for each of the recording columns formed on the magnetic recording medium 3, and is reproducible by the magnetic reproducing element 11. Note that, as shown in FIG. 8A and FIG. 8B, the tracking patterns 12 and 13 are each a group of small patterns (e.g., a group of 12-1 to 12-3, and a group of 13-1 to 13-3).

(Recording Method)

The controller 20 serving as the magnetic recording element control unit performs control so that a plurality of recording columns are formed in the second area at a constant pitch in the radial direction. More specifically, where the radial positions of the inner and outer circumferential edges of the n-th recording column for forming an n-th track are $R(n)_{in}$ and $R(n)_{out}$, respectively, and where the inner and outer adjacent recording columns to the n-th recording column are an (n−1)th recording column and an (n+1)th recording column, respectively, the controller 20 performs control so that the equation (1) is satisfied. This leaves information of the n-th recording column in at least a radial range from $R(n-1)_{out}$ to $R(n+1)_{in}$.

To record information in an area where no magnetic information is recorded, a plurality of recording columns are formed so that, starting from formation of the first recording column for forming the first track, the second recording column, the third recording column, . . . are sequentially formed to satisfy the equation (1). In other words, as in the above first embodiment, where the second, third, and fourth tracks are the track Tr16, track Tr17, and track Tr18, respectively as shown in FIG. 7A, $$R(17)_{in} < R(16)_{out} < R(18)_{in} < R(17)_{out}.$$

Therefore, the information on the third track Tr17 is retained at least in a non-overlapping portion which is a radial range from $R(16)_{out}$ to $R(18)_{in}$. When rewriting only the recording column for forming the third track Tr17, there is no need of overwriting the fourth and subsequent recording columns. This shortens the total time taken for rewriting, and achieves a higher substantial recording rate than that for the later-described first area.

Meanwhile, the controller 20 performs control so that a plurality of recording columns are formed in the first area at a constant pitch in the radial direction. More specifically, where the radial positions of the inner and outer circumferential edges of the m-th recording column for forming an m-th track are $R(m)_{in}$ and $R(m)_{out}$, respectively, and where the inner and outer adjacent recording columns to the m-th recording column are an (m−1)th recording column and an (m+1)th recording column, respectively, the controller 20 performs control so that the equation (4) is satisfied.

To record information in an area where no magnetic information is recorded, a plurality of recording columns are formed so that, starting from formation of the first recording column for forming the first track, the second recording column, the third recording column, . . . are sequentially formed to satisfy the equation (4). In other words, as in the above first embodiment, where the second, third, and fourth tracks are the track Tr19, track Tr20, and track Tr21, respectively as shown in FIG. 7B, $$R(20)_{in} < R(21)_{in} < R(19)_{out} < R(20)_{out}.$$

As in the above-described first embodiment, although the substantial recording rate for rewriting operation is lower than that for the second area, a highly dense recording is possible.

Thus, the present embodiment also enables the controller to selectively perform the first recording and the second recording. When information should be recorded at a high recording density, even if doing so will cause a lower substantial recording rate for rewriting operation, the information can be recorded in the first area through the first recording. On the other hand, when information should be recorded so that rewriting at a high substantial recording rate is possible, even if doing so will cause a relatively low density, the information can be recorded in the second area through the second recording. Selective use of the above-mentioned two recording modes in a single magnetic recording reproducing apparatus achieves the both a high recording density and a high substantial recording rate for rewriting operation.

(Reproduction Method)

The magnetic reproducing element 11 reproduces information in the second area by detecting the tracking pattern 12 to specify the radial position of a targeted track on the magnetic recording medium 3, and by performing tracking with respect to the track (radial position). As described above, the "track" formed by the first recording is a radial area retaining the information even after the recording column is overlapped with an adjacent recording column (i.e., an area of a recording column which is not covered by another recording column), and the "track" formed by the second recording is the non-overlapping portion. In the present embodiment, the tracking pattern 13 (specifically, later-described small patterns excluding those for distinguishing an even-number-th track from an odd-number-th track) is formed at a track pitch equal to that of tracks formed through the first recording, and the tracking pattern 12 (specifically, later-described small patterns excluding those for distinguishing an even-number-th track from an odd-number-th track) is formed at a track pitch equal to that of tracks formed through the second recording. This enables accurate tracking of the tracks formed by the first recording and tracks formed by the second recording, at a track pitch different from that of the first recording.

An inner edge of the small pattern 12-1, and an outer edge of the small pattern 12-2 are both in the center of the track Tr17, i.e., at a radial position expressed as $\{R(16)_{out}+R(18)_{in}\}/2$. Thus, the radial position of the magnetic reproducing element 11 is controlled so that a signal amplitude detected at the position of the small pattern 12-1 relative to the circumferential direction, and that detected at the position of the small pattern 12-2 relative to the circumferential direction are equal to each other. This enables positioning of the center position $P_r$ of the magnetic reproducing element 11 relative to the radial direction to the center of the track Tr17, i.e., the radial position expressed as $\{(R(16)_{out}+R(18)_{in}\}/2$.

The small patterns 12-3 are patterns for determining whether the track to be reproduced is an even-number-th track or an odd-number-th track. In the present embodiment, signals of the small pattern 12-1 and the small pattern 12-2 are continuously detected prior to reproduction of the track Tr17. After this, if there is a certain interval (an interval equivalent to a single small pattern) before a signal of the small pattern 12-3 is detected, the track Tr17 is determined as to be an odd-number-th track. For example, in cases of Tr16 and Tr18, signals of the small pattern 12-1' and the small pattern 12-2, or signals of the small pattern 12-1 and small pattern 12-2' are continuously detected. Then the signal of the small pattern 12-3 is also continuously detected, and no signal is detected thereafter for a certain interval (an interval equivalent to a single small pattern). Therefore, these tracks are determined as to be an even-number-th track.

The center position $P_r$ of the magnetic reproducing element 11 does not necessarily have to be at the center of the track Tr17, i.e., the radial position expressed as $\{R(16)_{out}+R(18)_{in}\}/2$. By controlling the center position $P_r$ of the magnetic reproducing element 11 to achieve $R(16)_{out}<P_r<R(18)_{in}$, signals from the track Tr17 are more clearly detected than signals from the adjacent track Tr16 and track Tr18, even after the track Tr17 is rewritten. This restrains reproduction errors.

In this case, the inner edge of the small pattern 12-1 and the outer edge of the small pattern 12-2 are positioned in radial positions between $R(16)_{out}$ and $R(18)_{in}$. This way, the radial position of the magnetic reproducing element 11 is controlled so that a signal amplitude detected at the position of the small pattern 12-1 relative to the circumferential direction, and that detected at the position of the small pattern 12-2 relative to the circumferential direction are equal to each other. This enables positioning of the center position $P_r$ of the magnetic reproducing element 11 relative to the radial direction so that $R(16)_{out}<P_r<R(18)_{in}$. Note that, for the purpose of optimizing the reproduction signal quality such as the error rate, according to the signal level, inter-track cross-talk, or noise level, it is possible to electrically offset the radial position of the magnetic reproducing element 11 within a range such that $R(16)_{out}<P_r<R(18)_{in}$ is satisfied, so that the radial position of the magnetic reproducing element 11 during reproduction is slightly different from the position of the same where the amplitudes of the detected signals from the small pattern 12-1 and the small pattern 12-2 are equal to each other.

Similarly, the magnetic reproducing element 11 reproduces information in the first area by detecting the tracking pattern 13 to specify the radial position of a targeted track on the magnetic recording medium 3, and by performing tracking with respect to the track (radial position).

An outer edge of the small pattern 13-1', and an inner edge of the small pattern 13-2' are both at the center of the track Tr20, i.e., at a radial position expressed as $\{R(21)_{in}+R(20)_{in}\}/2$. Thus, the radial position of the magnetic reproducing element 11 is controlled so that a signal amplitude detected at the position of the small pattern 13-1' relative to the circumferential direction, and that detected at the position of the small pattern 13-2' relative to the circumferential direction are equal to each other. This enables positioning of the center position $P_r$ of the magnetic reproducing element 11 relative to the radial direction to the center of the track Tr20, i.e., the radial position expressed as $\{R(21)_{in}+R(20)_{in}\}/2$.

The small patterns 13-3 are patterns for determining whether the track to be reproduced is an even-number-th track or an odd-number-th track. In the present embodiment, signals of the small pattern 13-1' and the small pattern 13-2' are continuously detected prior to reproduction of the track Tr20. After this, if there is a certain interval (an interval equivalent to a single small pattern) before a signal of the small pattern 13-3 is detected, the track Tr20 is determined as to be an even-number-th track. For example, in cases of Tr19 and Tr21, signals of the small pattern 13-1' and the small pattern 13-2, or signals of the small pattern 13-1 and small pattern 13-2' are continuously detected. Then the signal of the small pattern 13-3 is also continuously detected, and no signal is detected thereafter for a certain interval (an interval equivalent to a single small pattern). Therefore, these tracks are determined as to be an odd-number-th track.

The center position $P_r$ of the magnetic reproducing element 11 does not necessarily have to be at the center of the track Tr20, i.e., the radial position expressed as $\{R(21)_{in}+R(20)_{in}\}/2$. By controlling the center position $P_r$ of the magnetic reproducing element 11 to achieve $R(20)_{in}<P_r<R(21)_{in}$, signals from the track Tr20 are more clearly detected than signals from the adjacent track Tr19 and track Tr21. This restrains reproduction errors.

In this case, the inner edge of the small pattern 13-1' and the outer edge of the small pattern 13-2' may be positioned in radial positions between $R(21)_{in}$ and $R(20)_{in}$. This way, the radial position of the magnetic reproducing element 11 is controlled so that a signal amplitude detected at the position of the small pattern 13-1' relative to the circumferential direction, and that detected in the position of the small pattern 13-2' relative to the circumferential direction are equal to each other. This enables positioning of the center position $P_r$ of the magnetic reproducing element 11 relative to the radial direction so that $R(20)_{in}<P_r<R(21)_{in}$. Note that, as in the case of the second area, the radial position of the magnetic reproducing element 11 during reproduction may be slightly different from the position of the same where the amplitudes of the detected signals from the small pattern 13-1' and the small pattern 13-2' are equal to each other.

Further, the magnetic recording element 10 may form a recording column while the magnetic reproducing element 11 is performing tracking based on the signal detected from the tracking pattern 12. If the center position of a track to be reproduced is different from that of the recording column formed, relative to the radial direction, it is possible to track a radial position different from the position where the amplitudes of detected signals from the small pattern 12-1 and the small pattern 12-2 (or from the small pattern 13-1' and the small pattern 13-2') are equal to each other, by means of electric offset at the time of forming a recording column. This enables tracking when forming the recording columns, by using the tracking patterns 12 (or the tracking patterns 13) corresponding to the radial positions of the tracks. There is no need for an extra tracking pattern for forming a recording column separately from the tracking pattern for reproducing a recording column. As the result, recording error is reduced without a need of reducing the recording capacity.

As described, the first recording and the second recording are selectively performed in a single magnetic recording reproducing apparatus. This achieves the both a high recording density and a high substantial recording rate for rewriting operation. Further, it is possible to perform, during reproduction, accurate tracking of the tracks in the first area and those in the second area whose respective track pitches are different from each other, by using tracking patterns formed at the same track pitch as that of the corresponding area. Therefore, a magnetic recording reproducing apparatus in which a reproduction error hardly occurs is provided.

[Application to Laser (Heat)-Assisted Magnetic Recording Reproducing Apparatus]

The present invention is also applicable to a laser (heat)-assisted magnetic recording reproducing apparatus. In this case, the magnetic recording reproducing apparatus has a laser (heat) source for locally heating the recording medium. The recording medium in this case may be a magnetic recording medium having a magnetic recording film whose magnetic switching field is lowered to a desirable level when heated by the laser (heat).

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A magnetic recording reproducing apparatus, comprising:
    a disc-shaped magnetic recording medium having thereon information recording areas;
    a magnetic recording element configured to perform information recording, by applying a magnetic field to the magnetic recording medium to form recording columns extending in a circumferential direction of the magnetic recording medium;
    a magnetic reproducing element, which performs information reproduction by detecting leaked magnetic field from the magnetic recording medium;
    a moving mechanism configured to move the relative position of the magnetic recording medium to the magnetic recording element and the magnetic reproducing element, in the circumferential direction and a radial direction of the magnetic recording medium; and
    a magnetic recording element control unit configured to control the magnetic recording element and the moving mechanism so that, in the information recording area, recording columns adjacent to each other relative to the radial direction are partially overlapped with each other in the radial direction,
    wherein the magnetic recording element control unit selectively performs a first recording which achieves R1 in<R2 in<R3 in<R1 out<R2 out<R3 out,
    where radial positions of the inner and outer circumferential edges of a first recording column are R1 in and R1 out, respectively, and p1 radial positions of the inner and outer circumferential edges of a second recording column are R2 in and R2 out, the second recording column being the outer adjacent recording column to the first recording column, and
    radial positions of the inner and outer circumferential edges of a third recording column are R3 in and R3 out, the third recording column being the outer adjacent recording column to the second recording column, and
    a second recording such that each of the recording columns has a non-overlapping portion which is not overlapped with any of the recording column in the radial direction.

2. The magnetic recording reproducing apparatus according to claim 1, wherein
    in the second recording, the magnetic recording element control unit performs control so as to achieve R4 in<R5 in<R4 out<R6 in<R5 out<R6 out,
    where radial positions of the inner and outer circumferential edges of a fourth recording column are R4 in and R4 out, respectively,
    radial positions of the inner and outer circumferential edges of a fifth recording column are R5 in and R5 out, the fifth recording column being the outer adjacent recording column to the fourth recording column, and
    radial positions of the inner and outer circumferential edges of a sixth recording column are R6 in and R6 out, the sixth recording column being the outer adjacent recording column to the fifth recording column.

3. The magnetic recording reproducing apparatus according to claim 2, wherein
    where a width of the magnetic reproducing element relative to the radial direction is Wr, (R6 in−R4 out)>Wr/2.

4. The magnetic recording reproducing apparatus according to claim 1, further comprising:
    a threshold storage unit storing therein a threshold related to rewriting frequency;
    a content identifying unit which distinguishes content with a higher rewriting frequency than the threshold from content with a lower rewriting frequency than the threshold,
    wherein the magnetic recording element control unit performs control so that
    the content with a lower rewriting frequency than the threshold is recorded through the first recording, and
    the content with a higher rewriting frequency than the threshold is recorded through the second recording.

5. The magnetic recording reproducing apparatus according to claim 1, further comprising:
    a content identifying unit configured to determine whether content belongs to a first class or a second class for which a higher rewriting frequency than that of the first class is expected, based on the attribute of the content,
    wherein the magnetic recording element control unit performs control so that content belonging to the first class is recorded through the first recording, and content belonging to the second class is recorded through the second recording.

6. The magnetic recording reproducing apparatus according to claim 1, further comprising:
    an input unit which enables a user to select a recording mode for recording content, out of the first recording and the second recording,
    wherein the magnetic recording element control unit performs control so that the content is recorded through the recording mode selected by the user via the input unit.

* * * * *